United States Patent
Mito

[11] 3,765,748
[45] Oct. 16, 1973

[54] MECHANISM FOR RELATIVE ADJUSTMENT OF AXIALLY SPACED LENS COMPONENTS

[76] Inventor: Hiroshi Mito, Omiya, Japan
[22] Filed: Sept. 1, 1972
[21] Appl. No.: 285,833

[52] U.S. Cl. .................................................. 350/187
[51] Int. Cl. ............................................. G02b 7/10
[58] Field of Search ..................................... 350/187

[56] References Cited
UNITED STATES PATENTS
3,465,662 9/1969 Kashiwase..................... 350/187 X
3,663,093 5/1972 Iida.................................. 350/187

*Primary Examiner*—John K. Corbin
*Attorney*—Watson, Cole, Grindle & Watson

[57] ABSTRACT

In a lens system in which a basic lens component mounted fixedly on a fixed frame, two lens components movable along the optical axis for changing the magnification, and a lens component movable along the optical axis for focusing are axially spaced, a mechanism for relative adjustment of the axially spaced lens components comprising an operating cylinder fitted on the fixed frame to be axially movable and rotatable about the optical axis, the axial movement of said operating cylinder moving two lens components for changing the magnification, keeping the focusing lens components immovable relative to the basic lens component, to set the magnification of the lens system, and the rotation of said operating cylinder moving only the focusing lens component, keeping two lens components for changing the magnification immovable relative to the basic lens component, to set the focusing of the lens system.

6 Claims, 5 Drawing Figures

3,765,748

MECHANISM FOR RELATIVE ADJUSTMENT OF AXIALLY SPACED LENS COMPONENTS

BACKGROUND OF THE INVENTION

Field of the Invention

The present invention relates to a mechanism for relative adjustment of axially spaced lens components of an optical system, and more particularly to such a mechanism wherein changing the magnification and adjusting the focusing can be effected by one operating member.

In the prior art, it is well known that an objective lens component for focusing and a zooming lens component for zooming, and a compensating lens component, are spaced apart and are movable axially, relative to a basic lens component mounted on a fixed frame in the optical system.

However, the mechanism for relative adjustment of said axially spaced lens components is provided with two operating members, one of which, for zooming, is for a moving zooming lens component and a compensating lens component along the optical axis, keeping the objective lens component immovable relative to the fixed basic lens component, and the other of which is for adjusting the focusing by moving the objective lens component along the optical axis, keeping the zooming and compensating lens components immovable.

In the case of two operating members like this, when taking a picture in a hurry an inexperienced operator is apt to make a mistake in operation, resulting in spoiling the picture, and it takes time and trouble even for an experienced operator to adjust the two operating members.

THE OBJECT OF THE INVENTION

One object of the present invention is to provide a mechanism for relative adjustment of axially spaced lens components, which is capable of zooming and focusing a lens system in a zooming lens system by means of a single operating member.

Another object of the present invention is to provide a mechanism for relative adjustment of axially spaced lens components, which is so formed that in a zooming lens system, by moving a single operating member fitted in a fixed frame in the axial direction of said fixed frame, adjustment for zooming is effected, and by turning said member about said axis adjustment for focusing is effected.

Still further objects of the present invention will be obvious from the detailed description of the embodiments set forth below.

SUMMARY OF THE INVENTION

In order to attain the objects mentioned above, the present invention relates to a mechanism for relative adjustment of axially spaced lens components so devised that in an optical system the following four lens components are axially spaced: a basic lens component fixed to a fixed frame, a zooming lens component movable relatively to the basic component along the optical axis for zooming, a compensating lens component, and a focusing lens component whose optical axis is coincident with the optical axes of said other lens components and which is movable relative to the basic lens component and disposed on the objective side, for focusing; said respective lens components are mounted on the respective frame so as to be movable axially along said optical axis relative to said fixed frame and in addition are fitted on one operating member rotatable about said optical axis, and the axial movement of said operating member moves the zooming component frame and the compensating component frame, through cam means, along the optical axis relative to the fixed frame, and the optical system changes its total focal length to effect zooming, and the rotation of the operating member about the optical axis moves the focusing component frame through a helicoid mechanism along the optical axis relative to the fixed frame to focus the optical system upon an object at a predetermined distance.

DESCRIPTION OF THE PREFERRED EMBODIMENTS

Figure 1:
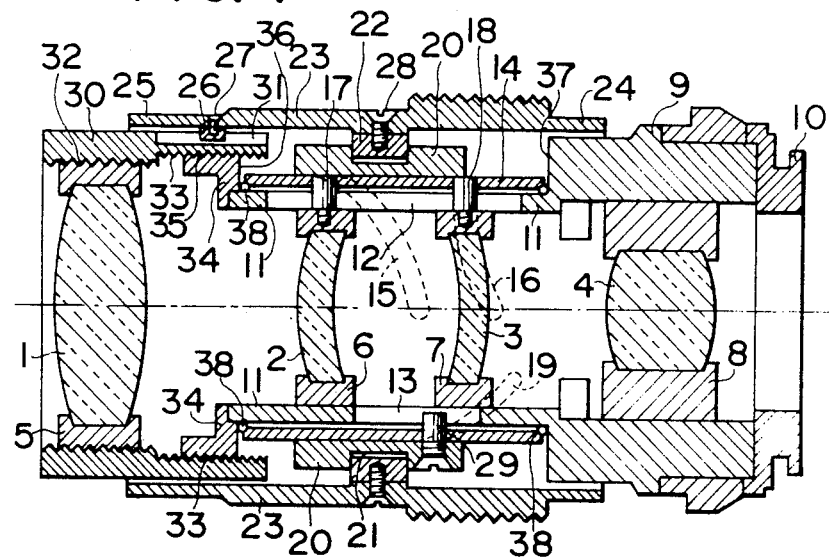
FIG. 1 is an axial section of one embodiment in accordance with the present invention.
Figure 2:
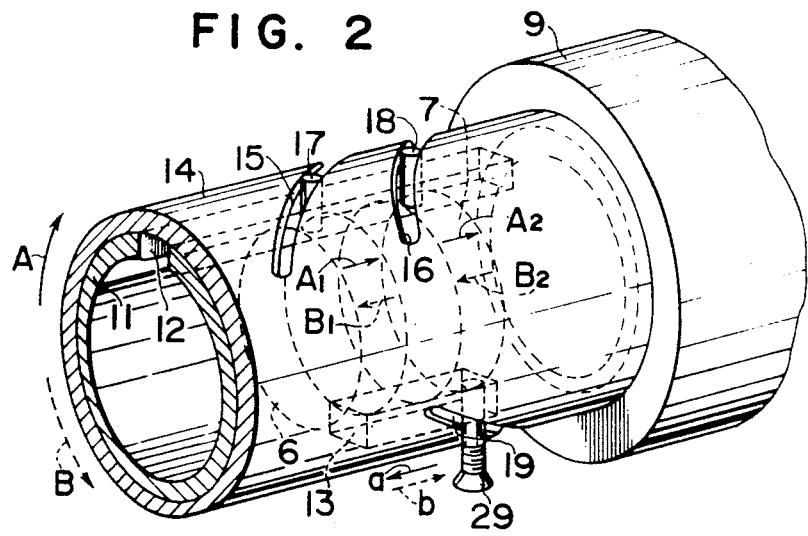
FIG. 2 is a perspective view of the essential portion of the embodiment of FIG. 1.

With reference to FIGS. 1 and 2, one embodiment in accordance with the present invention will now be described.

Reference numeral 1 denotes a focusing lens component positioned most closely to the object side and mounted on focusing component frame 5, 2 is a zooming lens component mounted on zooming component frame 6, 3 indicates a compensating lens component mounted on compensating component frame 7, and 4 is a basic lens component for forming an image and is mounted on basic component frame 8. Each respective lens component is shown simply and typically by a single lens; however, in practice these are usually formed by a plurality of lenses for correcting the aberration and the lenses of the respective components are optically coaxial.

Said basic component frame 8 is fixed to the fixed frame 9 in a position close to the image side thereof. Onto the end of the image side of fixed frame 9 there is attached fitting member 10 for mounting on a photographic camera, motion picture camera, or television camera using said optical system as an objective lens, and the object side of fixed frame 9 is thinned down to form cylindrical portion 11, and to the end thereof screw ring 34 is secured. The cylindrical portion 11 is provided with two slots 12 and 13 extending in the axial direction thereof.

On the inner periphery of said cylindrical portion 11 the zooming component frame and the compensating component frame are slidably fitted, and on the outer periphery of said cylindrical portion 11 control cylinder 14 is slidably fitted. The axial movement of control cylinder 14 relative to cylindrical portion 11 is restrained by step 37, formed at the boundary between fixed frame 9 and cylindrical portion 11, and the end edge of screw ring 34; however, control cylinder 14 can be freely turned and in order to reduce the frictional resistance between control cylinder 14 and cylindrical portion 11 a ball bearing 38 can be provided if desired.

Control cylinder 14 is provided with spirally formed cam slot 15, into which the head of pin 17, mounted on zooming component frame 6 and extending through slot 12 of cylindrical portion 11 projects, and a second cam slot 16 into which the head of pin 18, mounted on compensating component frame 7 and extending through slot 12 projects, and a third cam slot 19.

In addition, on the outside periphery of control cylinder 14, intermediate ring 20 is slidably fitted. The outer periphery of said intermediate ring 20 is formed with an annular slot 21 at right angles to the axis, and on intermediate ring 20 there is mounted pin 29 projecting inwardly. Pin 29 extends through the third cam slot 19 of control cylinder 14 and the head thereof engages in slot 13 of cylindrical portion 11.

On the outer periphery of screw ring 34, fixed to the end portion of the object side of cylindrical portion 11, a thread 35 is provided for engagement with thread 33 of focusing ring 30 and by the engagement of threads 33 and 35 a helicoid mechanism is formed.

On the outer periphery of the image side of focusing ring 30 there is provided an axially directed linear guide slot 31 and the inner periphery of focusing ring 30 is provided with thread 32 with which the thread formed on the outer periphery of focusing frame 5 engages.

Operating ring 23 is disposed outwardly of fixed frame 9, intermediate ring 20, and focusing ring 30, and thin cylindrical portion 24 of the image side of ring 23 is slidable relative to fixed frame 9 and to thin portion 25 of the object side of ring 23. One short first guide member 26, facing inwardly, is fixed by screw 27, said first guide member 26 engaging linear slot 31 of focusing ring 30. The central portion of operating ring 23 is provided with a plurality of second guide members 22 fixed on the same circumference of the inner periphery thereof by screws 28, and these second guide members 22 engage annular slot 21 of intermediate ring 20. Suitable means for facilitating the manual operation of operating ring 23 are provided on the outer periphery thereof.

In using the embodiment described above, when operating ring 23 is rotated manually, or by any other means, relative to fixed frame 9, first guide member 26 engages with slot 31 to transmit the turning force thereto and focusing ring 30 is rotated about its axis as a center, and by the helicoid mechanism of threads 33 and 35 focusing component frame 5 is moved along the optical axis relative to fixed frame 9.

In said embodiment a single helicoid mechanism is used so that, as described above, focusing component frame 5 is axially moved by rotation relative to fixed frame 9; however, if a well known double helicoid mechanism is used instead, focusing component frame 5 can be axially moved without rotating. For example, in the described embodiment it is only required, for this purpose, that by means of a member projecting from screw ring 34 the rotation of focusing component frame 5 is restrained, to enable it to slide only in the axial direction, and that the pitches of threads 33 and 32 be changed.

In this case, second guide member 22 slides only along the annular slot 21 and the rotation of operating ring 23 is not transmitted to intermediate ring 20. Accordingly, control cylinder 14 does not turn and the zooming component frame and the compensating component frame do not move. Therefore, in this case, zooming of the optical system is not effected and only focusing for the photographic length is effected.

On the other hand, when operating ring 23 is axially moved without rotation relative to fixed frame 9, first guide member 26 slides along slot 31 and the movement thereof is not transmitted to focusing ring 30, while second guide member 22 engages with annular slot 21 to drive intermediate ring 20 axially. As a result, intermediate ring 20 moved axially in the direction shown by arrow a or b in FIG. 2 relative to control cylinder 14, by which the axial displacement is checked, and pin 29 thereof is in engagement with third cam slot 19, so that control cylinder 14 is rotated in the direction shown by arrow A by displacement of intermediate member 20 in said direction a, and in the direction shown by arrow B by displacement of intermediate member 20 in the direction b. Thus the first cam slot 15 and the second cam slot 16 are turned. Pin 17 engaged in the first cam slot 15 and linear slot 12, to make only an axial displacement, makes an axial displacement in the direction shown by arrow $A_1$ through the A directional turning, and an axial displacement in the direction shown by arrow $B_2$ through the B directional turning. At the same time, pin 18 engaged in the second cam slot 16 and linear slot 12, to make only an axial displacement, makes an axial displacement in the direction shown by arrow $A_2$ through the A directional turning and an axial displacement in the direction shown by arrow $B_2$ through the B directional turning.

As a result, zooming component frame 6 carrying the pin 17 slides in cylindrical portion 11 to make an axial displacement in the direction shown by arrow $A_1$ or $B_1$, and compensating component frame 7 carrying pin 18 slides in cylindrical portion 11 to make an axial displacement in the direction shown by arrow $A_2$ or $B_2$.

The displacement of both frames 6 and 7 in the direction shown by arrows $A_1$ and $A_2$ zooms the optical system to the short focal length side and the displacement in the direction shown by arrows $B_1$ and $B_2$ zooms the optical system to the long focal length side.

Figure 3:
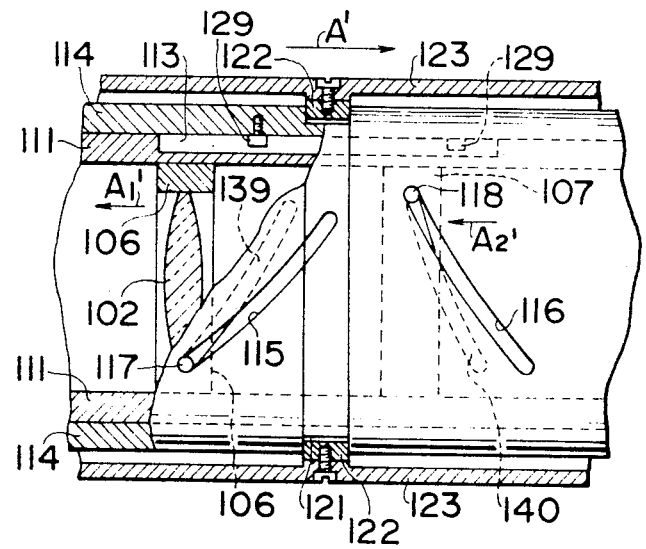
FIG. 3 is a side view partially cut away showing the essential portion of another embodiment of the present invention.
Figure 4:
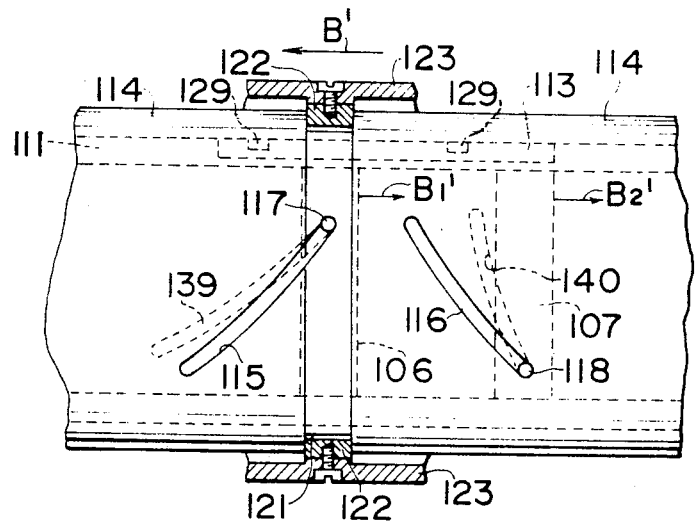
FIG. 4 is a side view showing the lens zoomed from the position shown in FIG. 3.

FIGS. 3 and 4 show a second embodiment in accordance with the present invention, wherein the zooming operation is different.

FIG. 3 shows a section thereof, wherein a fixed frame formed in a body with cylindrical portion 111, a threaded ring fixed to the end portion of cylindrical portion 111 on the object side, a focusing ring carrying the focusing component frame in threaded engagement with said threaded ring, and an operating ring for enclosing these and having a first guide member and a second guide member, are quite the same as those described in the first embodiment, so that portions thereof are omitted in the drawing.

In the drawing showing cylindrical portion 111 formed in a body with the fixed frame, cam slots 139 and 140 are formed in the spiral shape as shown in the drawing and on the cylindrical portion 111 linear slot 113 is formed in parallel with the axis thereof.

On the inner periphery of control cylinder 114, slidably mounted on said cylindrical portion 111, pin 129 is mounted for engaging in the linear slot 113, and on the outer periphery thereof annular slot 121 is formed, in which second guide member 122 fixed on operating ring 123 is engaged. On the periphery of control cylinder 114 there are formed first cam slot 115 in a spiral shape corresponding to said cam slot 139, but different therefrom in pitch, and second cam slot 116 in a spiral shape corresponding to cam slot 140 but different therefrom in pitch.

Pin 117 on zooming component frame 106, slidable on the inner periphery of said cylindrical portion 111, is slidably engaged in cam slot 139 of said cylindrical portion 111, and first cam slot 115 of control cylinder 114, and pin 118 carried on compensating component frame 107, slidable on the inner periphery of cylindrical portion 111, is slidably engaged in cam slot 140 of cylindrical portion 111 and second cam slot 116 of control cylinder 114.

The operation of this embodiment will now be described. In the same way as in the first embodiment, upon turning operating ring 123 second guide member 122 thereof slides in annular slot 121 relative to control cylinder 114 which rotation is checked by linear slot 113 and pin 129 relative to cylindrical portion 111. On the other hand, first guide member 26 (not shown in the drawing) in the first embodiment turns focusing ring 30 in quite the same manner as in the first embodiment and moves axially the focusing ring in threaded engagement with the threaded ring fixed to the end of the object side of cylindrical portion 11 together with focusing component frame 5, so as to effect focusing as required.

Upon the axial movement of operating ring 123, second guide member 122 engages with annular slot 121 and moves axially the control cylinder 114, and thereby the intersecting point on the circle of first cam slot 115 of control cylinder 114 and cam slot 139 of cylindrical portion 111 is displaced. Thus zooming component frame 106 of which pin 117 fits in said intersecting point moves axially while turning, and in the same way also the compensating frame component of which pin 118 fits in the intersecting point on the circle of second cam slot 116 and cam slot 140 of cylindrical portion 111 moves to effect zooming. In this case, the focusing component frame is not displaced axially in the same manner as in the first embodiment.

As seen from FIG. 3, when control cylinder 114 is moved to the direction shown by arrow A' together with operating member 123, zooming component frame 106 is displaced on the axis in the direction shown by arrow $A_1'$ and compensating component 107 is displaced on the axis in the direction shown by arrow $A_2'$ to effect zooming of the optical system to the short focal length side, and when control cylinder 114 is moved along the axis in the direction shown by arrow B' as shown in FIG. 4, zooming component frame 106 is axially displaced in the direction shown by arrow $B_1'$, and compensating component frame 107 is axially displaced in the direction hown by arrow $B_2'$, and the optical system is zoomed to the long focal length side.

According to the second embodiment, intermediate ring 20 can be omitted, and in the first embodiment the control cylinder is turned relative to the axis, while in the second embodiment the control cylinder is axially displaced and thereby the construction is simplified.

However, in the first embodiment the zooming component and the compensating component frame are not turned and the axial displacement effects zooming, while in the second embodiment these two component frames are axially displaced while turning, so that in order to allow the optical axes of these lens components to coincide with those of the other lens components at all times, good precision of both component frames is required.

Figure 5:
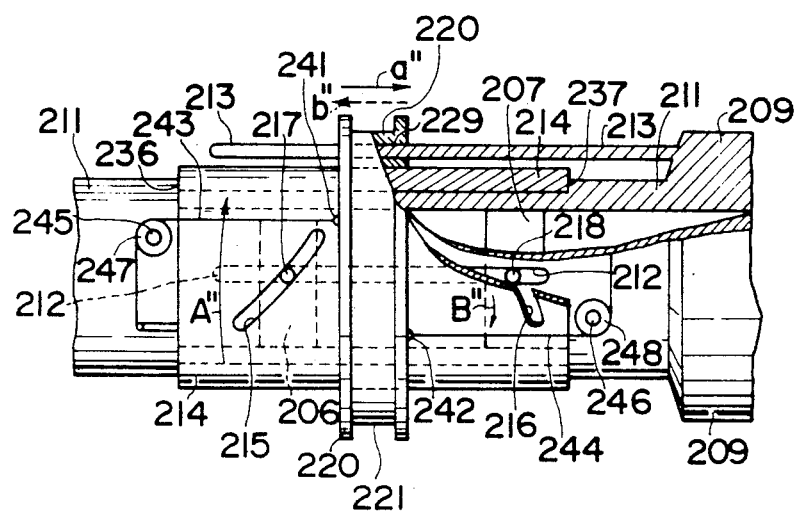
FIG. 5 is a side view partially cut away showing the essential portion of a third embodiment in accordance with the present invention.

While in the first embodiment the axial displacement of intermediate ring 20 is converted to the turning motion of control cylinder by the third cam slot 19, pin 29 on intermediate ring 20 and axial slot 13 formed on cylindrical portion 11, in the third embodiment of the present invention shown in FIG. 5, for example, by fitting pin 213 projecting from fixed frame 209 toward the object side and in parallel with the axis, in hole 229 parallel with the axis through intermediate ring 220, turning about the axis of intermediate ring 220 as a center is restrained. Strips or ribbons 243 and 244 are fixed to points 241 and 242 on the object side and the image side of intermediate ring 220, respectively.

Said strips or ribbons 243 and 244 are made of material which is flexible but of substantially constant length. Cylindrical portion 211 retains control cylinder 214 so as to enable rotation thereof about its axis while checking its axial displacement by means of steps 236 and 237 on the outer periphery of cylindrical portion 211, and at the same time supports rotatably pulleys 247 and 248 respectively by means of shaft 245 and 246 on said control cylinder 214.

Said strips or ribbons 243 and 244 are trained over said pulleys 247 and 248 respectively, and the other ends thereof are connected respectively to fitting portions (not shown in the drawings) formed on the respective ends of control cylinder 214.

On the periphery of said control cylinder 214 first cam slot 215 and second cam slot 216 are spirally formed respectively, and in first cam slot 215 pin 217 carried by zooming component frame 206 is engaged, passing through linear slot 212 extending axially in the periphery of cylindrical portion 211, and in the second cam slot 216 pin 218 carried by compensating component frame 207, passing through said linear slot 212.

Therefore, when intermediate ring 220 is axially displaced in the direction shown by arrow $a''$ by the operating ring (not shown in FIG. 5 but having the same form as operating ring 23 of FIG. 1), control cylinder 214 is turned in the direction shown by arrow $A''$ and when intermediate ring 220 is axially displaced in the direction shown by arrow $b''$ control cylinder 214 is turned in the direction shown by arrow $B''$ to effect zooming, and in this case the focusing ring is not displaced axially, in the same manner as in the first and second embodiments.

When the operating ring is turned, focusing is effected and in this case zooming is not effected, in the same manner as in the first embodiment too.

In the first two embodiments the combination of the operating ring and the intermediate ring or control cylinder is attained by fitting the second guide member in the annular slot; however, this result can be attained also by providing a short pitched thread on the inner periphery of the operating ring and forming the same pitched thread also on the outer perphery of the intermediate ring or the control cylinder, so as to engage each other. In this case, the rotation of the operating ring imparts to the intermediate member or the control cylinder a little axial force. However, the quantity of displacement is very short and only the operating ring is required to be displaced.

As shown in the embodiments described above, the present invention is characterized in that the adjustment of zooming can be effected by moving axially the single operating ring and the focusing can be effected by turning said operating ring.

As is clear from the above description of the respective embodiments, many modifications and variations can be made in the present invention and also variations in detail in design can be employed within the scope of the present invention. All such variations and modifications are to be included within the scope of the present invention.

I claim:

1. A mechanism for relative adjustment of axially spaced lens components comprising:
    a fixed frame mounting a basic lens component disposed nearest the image side of said axially spaced lens components;
    cylindrical means extending from said fixed frame to the object side of said components, and having a guide slot on the periphery thereof and a threaded ring for forming part of a helicoid mechanism on the tip thereof;
    a threaded focusing ring engaged by said threaded ring and forming the other part of said helicoid mechanism, and having a focusing component frame for mounting a focusing lens component on the inner periphery thereof and an axial slot on the outer periphery thereof;
    a control cylinder fitted slidably on said cylindrical means and having a first spiral cam slot and a second spiral cam slot at least on the periphery thereof;
    a guide means in the form of a ring-shaped member interlocked with said control cylinder perpendicularly to the axis;
    an operating member fitted on said control cylinder and said focusing ring so as to cover at least a portion thereof and capable of rotation about the axis and axial displacement;
    a first guide member fixed to said operating member and slidable in said axial slot for transmitting only rotary motion about the axis to said focusing ring;
    a second guide member fixed to said operating member for cooperating with said ring-shaped guide means to transmit only the axial displacement of said operating member to said control cylinder;
    a zooming component frame for mounting a zooming lens component, fitted slidably in the inner periphery of said cylindrical means and having a pin extending through said guide slot and fitted slidably in said first cam slot; and
    a compensating component frame for mounting a compensating lens component, fitted slidably on the inner periphery of said cylindrical means and having a pin extending through said guide slot and fitted slidably in said second cam slot.

2. A mechanism for a relative adjustment of axially spaced lens components as set forth in claim 1, said cylindrical means having stop means for checking the axial displacement of the control cylinder fitted slidably on the cylindrical means, a first guide slot parallel to the axis, and a second guide slot parallel to said axis separated from said first guide slot, said guide slots being formed on the periphery of said cylindrical means;
    a third cam slot formed spirally on the periphery of said control cylinder; and
    an intermediate ring fitted slidably around said control cylinder, which has a pin extending toward the axis for fitting slidably in said third cam slot and said second axial slot, and an annular guide means to cooperate with the second guide member in the direction perpendicularly to the axis on the periphery of said control cylinder.

3. A mechanism for a relative adjustment of axially spaced lens components as set forth in claim 2, wherein said annular guide means is an annular slot formed perpendicularly to the axis on the outer periphery of the intermediate ring, and said second guide member projects from the inner periphery of the operating ring and consists of at least one projection fitted slidably in said annular guide slot.

4. A mechanism for a relative adjustment of axially spaced lens component as set forth in claim 2, wherein said annular means consists of a short pitched thread formed axially on the outer periphery of the intermediate ring, and said second guide member projects from the inner periphery of the operating ring and consists of a thread meshed with said short pitched thread.

5. A mechanism for a relative adjustment of axially spaced lens components as set forth in claim 1,
    said cylindrical means having stop means for checking the axial displacement of the control cylinder fitted slidably around said cylindrical means and further comprising pulleys supported rotatably respectively beyond the object side and the image side of said control cylinder;
    an intermediate ring fitted slidably on the outer periphery of said control cylinder and having an annular guide means perpendicular to the axial direction for cooperating with the second guide member;
    means provided on the fixed frame for checking the rotation about the axis of said intermediate ring; and
    two flexible members one end of one said member being fixed to the end face of the object side and one end of the other said member being fixed to the end face of the image side of said intermediate ring, the other ends of said members being fixed to the end face of the object side and to the end face of the image side of said control cylinder, respectively, via one of said pulleys.

6. A mechanism for relative adjustment of axially spaced lens components as set forth in claim 1,
    said cylindrical means being fixed to said fixed frame to project axially and having spiral fourth and fifth cam clots on the periphery thereof and an axial slot as guide slots on the periphery thereof;
    said control cylinder fitted slidably around the outer periphery of said cylindrical means having a projection extending from its inner periphery for fitting in said axial slot to check the rotation around the axis thereof, said first cam slot formed spirally on the periphery thereof intersecting said fourth cam slot on the periphery, said second cam slot formed spirally on the periphery thereof intersecting said fifth cam slot on the periphery, and an annular guide slot perpendicular to the axis on the outer periphery;
    said operating ring being provided with a second guide member fitted slidably in said annular guide slot to transmit axial motion;
    said zooming component frame fitted slidably on the inner periphery of said cylindrical means having a pin projecting from its outer periphery to fit in the intersection point of the first and the fourth cam slots; and said compensating component frame fitted slidably on the inner periphery of said cylindrical means having a pin projecting from its outer periphery to fit in the intersection point of the second and the fifth cam slots.

* * * * *

UNITED STATES PATENT OFFICE
CERTIFICATE OF CORRECTION

Patent No. 3,765,748           Dated October 16, 1973

Inventor(s) Hiroshi Mito

It is certified that error appears in the above-identified patent and that said Letters Patent are hereby corrected as shown below:

[30] Foreign Application Priority Data

Nov. 10, 1971    Japan 89686

Signed and sealed this 23rd day of April 1974.

(SEAL)
Attest:

EDWARD M. FLETCHER, JR.           C. MARSHALL DANN
Attesting Officer                   Commissioner of Patents